United States Patent

[11] 3,563,564

| [72] | Inventor | Walter A. Bartkowiak |
| | | Warren, Mich. |
| [21] | Appl. No. | 826,511 |
| [22] | Filed | May 21, 1969 |
| [45] | Patented | Feb. 16, 1971 |
| [73] | Assignee | General Motors Corporation |
| | | Detroit, Mich. |

[54] VEHICLE WHEEL MOUNTING
5 Claims, 1 Drawing Fig.

[52] U.S. Cl. .................................................. 280/96.1,
280/96.2; 287/87
[51] Int. Cl. .................................................. B62d 7/18
[50] Field of Search .................................................. 280/96.1,
96.2, 96.2 (1); 180/43; 287/87, 90 (A), 90 (C)

[56] References Cited
UNITED STATES PATENTS

| 2,605,118 | 7/1952 | Booth et al. .................. | 280/96.2 |
| 2,779,603 | 1/1957 | McRae .......................... | 280/96.2X |
| 2,900,196 | 8/1959 | Nienke .......................... | 280/96.1 |
| 2,936,188 | 5/1960 | Moskovitz .................... | 287/90 |
| 3,279,834 | 10/1966 | Budzynski .................... | 287/90 |
| 3,472,331 | 10/1969 | Baker et al. .................. | 180/43 |

FOREIGN PATENTS

| 805,403 | 12/1958 | Great Britain .............. | 287/90 |
| 894,131 | 4/1962 | Great Britain .............. | 280/96.2 |

*Primary Examiner*—Benjamin Hersh
*Assistant Examiner*—Leslie J. Paperner
*Attorneys*—J. L. Carpenter and E. J. Biskup

ABSTRACT: A wheel-mounting assembly having a kingpin-type steering knuckle connected by a pair of tension-type ball joints to a beam type axle. One of the ball joints is secured to the steering knuckle by vertically adjustable means which permit the tension loading on the ball joints to be set at a desired level.

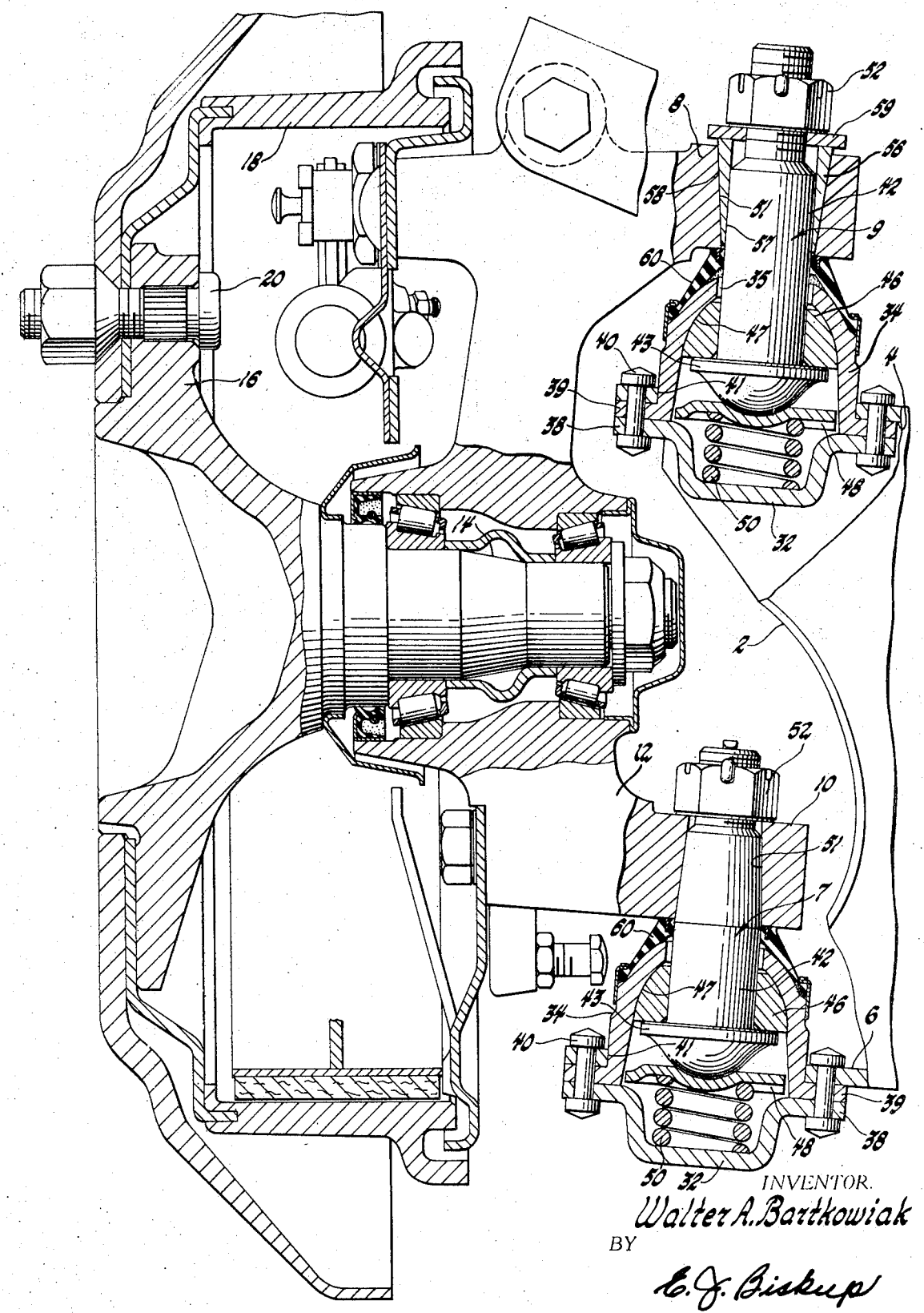

VEHICLE WHEEL MOUNTING

This invention relates to a vehicle wheel-mounting assembly having a beam-type axle connected to a kingpin-type steering knuckle by a pair of tension-type ball joints.

In trucks and other heavy duty vehicles, the front wheels are often dirigibly connected on solid eye beam-type axles by what is commonly known as a reverse Elliott steering knuckle assembly in which bifurcated inner portions of the knuckle overlap the terminal end of the axle and are connected thereto by a kingpin passing through aligned apertures in the axle and overlapping portions. While this basic type of construction has proved to be both simple and rugged, optimum results depend upon initial establishment of relatively fine tolerances. In addition, this form of design is not entirely satisfactory, one reason being that the enclosed knuckle with its wet sump requires a special lubricant and is susceptible to gasket oil leakage. Moreover, to seal the lubricant around the kingpin, the seals around the end of the axle are necessary which limit the number of degrees through which the steering knuckle can be turned. Another problem with the prior kingpin type steering knuckle is that the preload is opposite in direction which necessitates building more preload in the assembly than the maximum load developed by road conditions.

The present invention contemplates a wheel-mounting assembly having a solid or beam-type axle connected to a kingpin type steering knuckle by a pair of tension-type ball joints. By mounting the axle on the steering knuckle by tension-type ball joints, both of the ball joints are loaded in the direction of the supported load rather than opposed thereby splitting the axle load between the upper and lower structures. This allows a weight and cost savings through reduced section in the yoke and knuckle areas. In addition, readily accessible means are provided which make it possible to adjust the load on the ball joints so as to frictionally control steering effort. In this connection, the lower ball joint's stud shank is formed with a taper which enables it to be secured to the lower projection of the steering knuckle in a vertically fixed position. The upper ball joint stud shank, on the other hand, is formed with a cylindrical configuration and is slidably received in a bearing sleeve having a cylindrical inner face and a tapered outer face corresponding to a tapered aperture in the steering knuckle's upper projection. This arrangement permits the upper ball joint stud shank to be secured to the upper projection of the steering knuckle and be vertically adjustable relative thereto so that the upper ball joint as a unit can be drawn up into the steering knuckle projection by tightening a nut on the stud shank so as to transfer some of the load from the lower ball joint to the upper ball joint and thereby help eliminate wheel shake and lessen steering effort. The tapered bearing sleeve arrangement provides the further advantage of taking up any diametrical variations and inaccuracies in the steering knuckle's upper aperture and thereby greatly simplifies manufacture. In the preferred form of the invention, a bellows-type seal is also placed over each ball joint socket to seal against the ball stud's shank and the lower edge of the steering knuckle's projection associated therewith so as to provide a compact easily assembled individual seal for each ball joint.

One significant advantage realized by the invention as described above is that the drop or bend in the axle necessary to clear the engine is minimized and space is made available in the area of the spindle axis for potential front-wheel drive and direct speedometer cable hookup to the wheel. Moreover, minimizing the bend necessary in the axle facilitates the fabrication of a relatively light stamped axle, and the use of individual ball joints as opposed to a kingpin makes the alignment of the apertures in the steering knuckle less critical.

Accordingly, the objects of the present invention are to provide a vehicle wheel-mounting assembly in which the steering knuckle is rotatably connected to the axle by a pair of tension-type ball joints, one of which is vertically adjustable to vary the loading on the ball joints; to provide a wheel mounting assembly utilizing tension-type ball joints with individual lubricant seals to enable large wheel-turning angles; to provide a wheel-mounting assembly having tension-type ball joints connecting a steering knuckle with one end of a transverse axle and incorporating readily accessible adjustable means associated with one of the ball joints for vertically positioning the latter relative to the other ball joint so as to establish a predetermined tension loading on the ball joints; to provide a steering knuckle having a pair of projections each supporting tension-type ball joints loaded in the direction of the supported load and secured to the steering knuckle in a manner that permits one of the ball joints to have the ball stud thereof vertically adjusted relative to the supporting projection so as to obtain a desired tension loading on the ball joints; to provide a vehicle wheel-mounting assembly utilizing tension-type ball joints that can have the loading thereon adjusted to a predetermined level so as to enable frictional control of the vehicle's steering effort; and to provide a dirigible vehicle wheel mounting assembly utilizing tension-type ball joints and having a simple means for adjusting the camber and compensating for dimensional variations in the assembly.

The foregoing and other objects, advantages and features of the invention will become more readily apparent as reference is had to the accompanying specification and drawing wherein there is illustrated a dirigible wheel knuckle assembly incorporating the invention.

In the drawing, the reference numeral 2 generally designates a transversely disposed drop center beam-type front axle commonly utilized in heavy-duty vehicles. It will be understood that the axle 2 is symmetrical and accordingly, the foregoing description relating to one end of the axle applies equally to the opposite end of the axle, not shown. At its terminal end, axle 2 is formed with two vertically spaced horizontal projection 4 and 6. Overlapping projections 4 and 6 are vertically spaced inwardly extending projections 8 and 10 formed on a wheel knuckle 12. These overlapping projections of the axle 2 and wheel knuckle 12 are rotatably fastened together by tension-loaded lower and upper ball joints identified generally by the reference numerals 7 and 9.

Rotatably secured within the steering knuckle 12 is a wheel axle or live spindle 14 having an outer flange 16 which supports a brake drum 18 and also removably supports a road wheel, not shown, by means of conventional screw studs 20. The tension-loaded ball joints 7 and 9 serve to mount the steering knuckle 12 on the axle 2 to provide maximum clearance around the axis of rotation of the wheel and minimize the center drop necessary in the beam-type axle.

Each of the ball joints 7 and 9 is formed with a socket portion comprising an end cap 32 and a cup 34 having their respective mating flanges 38 and 39 held and sealed together by rivets 40 which serve to fix the socket portion within an aperture 41 formed in the associated axle projection. An integral stud 42 extends down into each of the socket portions through an opening in the top of cup 34. The integral stud 42 has a ball portion including a generally hemispherical lower end with a diameter larger than the diameter of the stud shank so that a flat annular surface 43 perpendicular to the longitudinal axis of the stud shank exists to support a spherical bearing element 46 operating between spherical bearing surface 47 on the inside of cup 34 and the integral stud 42 described above. The generally hemispherical shaped lower end of each integral stud 42 contacts a plate 48 and is biased against bearing element 46 by a coil spring 50 acting between end cap 32 and the plate 48. The shank of each integral stud 42 extends upwardly through the socket portion and passes through a tapered aperture 51 formed in the associated projection and is drawn into and secured within the aperture 51 by a nut 52 threaded onto the upper end of the stud.

The tensile load imposed on the lower ball joint 7 is a function of the load on the vehicle, while the load on the upper ball joint 9 is selectively preset by adjustably tightening the nut 52 thereof. In this regard, it will be noted that the shank of the lower integral stud 42 is tapered toward its upper end and has a configuration which corresponds with that of the tapered aperture 51 in the projection 10. As a result, once the shank of the lower ball joint 7 is positioned within aperture 51 and the nut 52 is tightened onto the projection 10, the shank is locked in place and restrained from any movement. On the other hand, the shank of the upper ball joint's integral stud 42 is cylindrical in form and is located within an axially fixed bearing sleeve 56 having a corresponding cylindrical inner face 57. As a result, tightening of the nut 52 associated with the upper ball joint 9 causes the latter's shank to be drawn upwardly into the opening defined by the cylindrical face 57. Inasmuch as the lower ball joint 7 is rigidly secured to the projection 10, the upward movement of the shank associated with the upper ball joint 9 serves to transfer some of the load from the lower ball joint 7 to the upper ball joint 9. Accordingly, tension loading on the ball joint 7 and 9 can be adjusted and established at a predetermined acceptable level very readily without requiring any disassembling of parts.

It will be noted that the outer face 58 of bearing sleeve 56 is formed with a taper which corresponds to the tapered aperture 51 in the upper projection 8. Thus, any diametrical variations in the aperture 51 in the projection 8 and outer face 58 of the bearing sleeve 56 can be compensated for when the nut 52 is tightened against washer 59 so as to force bearing sleeve 56 down into the aperture.

Moreover, the use of the bearing sleeve 56 provides a relatively simple means for adjusting wheel camber. In this regard, it will be noted that bearing sleeve 56 is formed with its cylindrical inner face 57 eccentrically located within the tapered outer face of the bearing sleeve 56 so that wheel camber can be easily adjusted by rotating the bearing sleeve 56 about its longitudinal axis relative to the steering knuckle's projection 8 to provide the desired setting prior to tightening nut 52.

Although not apparent from the drawings, one feature of the invention described above is that the vehicle is, in effect, hung from the projections 8 and 10 of the steering knuckle 42 on axle 12. As a result, the drop necessary in the axle 2 to enable it to pass under the engine is much less than would be necessary if the axle's end projections 4 and 6 had to be located above the steering knuckle's projections 8 and 10 to receive, for example, compression-type ball joints. In addition, the use of a tension-type ball joint arrangement made according to the invention infringes least on the areas surrounding the spindle axis. This provides increased clearance near the spindle axis, and therefore the ability to move the axis of rotation of the steering knuckle 12 outboard as well as the potential of front wheel drive and direct speedometer cable hookups to a live spindle 14.

A further feature realized by the use of tension ball joints as employed in this invention is that it enables the use of individual bellows-type lubricant seals 60 which can be mounted on the exterior surface of socket cups 34. The upper end of seal 60 seals against the stud's shaft and the flat surface on the lower side of the knuckle projections. These seals 60 are compact and yet easy to assemble in that they are mounted on the ball joint rather than spun inside the socket as might be necessary in other wheel-mounting assemblies.

I claim:

1. A vehicle wheel-mounting assembly comprising, a wheel knuckle having a first pair of vertically spaced projections formed with aligned apertures the longitudinal center axes of which define a common generally vertically extending steer axis about which the vehicle wheel is movable, an axle end portion having a second pair of vertically spaced projections disposed in vertically staggered relation with said first pair of spaced projections, a pair of tension-loaded ball joints each including a socket portion and a ball portion, a stud carrying said ball portion and extending into said socket portion, means rigidly mounting said socket portion on each of said second pair of spaced projections along said steer axis, means securing one of said studs in one of said apertures in vertically fixed relation thereto, means mounting the other of said studs in the other of said apertures in vertically adjustable relation thereto, and means for locking said last mentioned stud in fixed relation to said other aperture upon establishment of a predetermined tension loading of the ball joint associated therewith.

2. The vehicle wheel-mounting assembly as recited in claim 1 wherein said means securing one of said studs in one of said apertures in vertically fixed relation thereto comprises a tapered surface formed on said one of said studs adapted for locking engagement with a corresponding tapered surface formed in said one of said apertures.

3. The wheel-mounting assembly as recited in claim 1 wherein said mounting means for said vertically adjustable stud includes a cylindrical shank formed on the other of said studs, a bearing sleeve mounted in said other aperture and having a cylindrical inner face for supporting said cylindrical shank for axial movement along said steer axis, said bearing sleeve being formed with a tapered outer face adapted for locking engagement with a corresponding tapered face formed in said other of said apertures so that any diametrical variations in said other of said apertures will be taken up by the seating of said bearing sleeve.

4. The vehicle wheel-mounting assembly as recited in claim 3 wherein said bearing sleeve mounted in said other aperture is formed with said cylindrical inner face having its center axis located eccentrically relative to the center axis of said other of said apertures so that wheel camber of the vehicle can be adjusted by rotating said bearing sleeve about its center axis relative to said steering knuckle projection.

5. A vehicle wheel-mounting assembly comprising, a wheel knuckle having a pair of vertically spaced upper and lower projections with aligned tapered apertures; and axle having an end portion with a pair of vertically spaced upper and lower projections formed with apertures disposed below and in vertically staggered relation with said apertures in said wheel knuckle projections; a pair of tension-loaded ball joints each including a socket portion, a ball portion bearing against the inside of said socket portion and a stud extending through said ball portion and into said socket portion, the socket portion of each of said ball joints being rigidly mounted within the apertures in said axle projections, means rigidly securing the stud of one of said ball joints within the aperture formed in said lower knuckle projection, said means including a tapered shank formed on said stud and adapted for vertically locked engagement with said tapered aperture in the lower projection of said wheel knuckle, means adjustably securing the stud of the other of said ball joints within said tapered aperture formed in the upper knuckle projection, said last-mentioned means including a cylindrical shank formed on said stud and a bearing sleeve having a tapered outer face corresponding to and mounted within said tapered aperture in said upper projection of said wheel knuckle projection, said bearing sleeve having a cylindrical inner face with its center eccentrically located relative to the center of the accommodating tapered aperture so that wheel camber can be adjusted by rotating the bearing sleeve relative to said upper wheel knuckle projection, a nut threaded on the stud of the other of said ball joints and bearing against said bearing sleeve so that upon tightening said nut the load carried by the latter-mentioned ball joint can be preset to a desired tension loading, and a lubricant seal carried by each socket portion and sealingly engaging the socket portion, the stud shank and the wheel knuckle projection associated therewith to effectively seal the ball joint.